(No Model.)
R. M. HUNTER.
REGULATOR FOR DYNAMO ELECTRIC MACHINES.
No. 347,937. Patented Aug. 24, 1886.
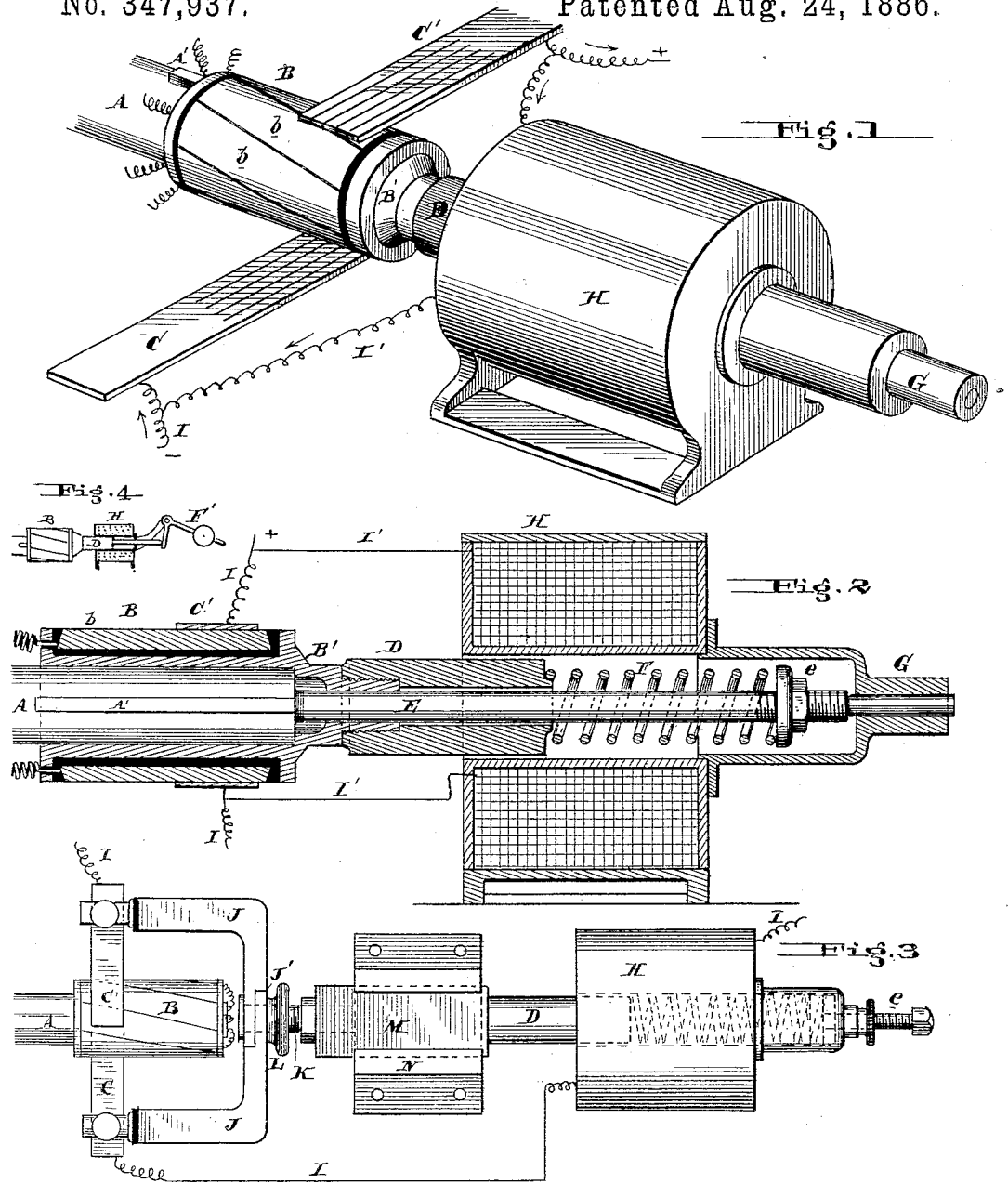

UNITED STATES PATENT OFFICE.

RUDOLPH M. HUNTER, OF PHILADELPHIA, PENNSYLVANIA.

REGULATOR FOR DYNAMO-ELECTRIC MACHINES.

SPECIFICATION forming part of Letters Patent No. 347,937, dated August 24, 1886.

Application filed July 14, 1885. Serial No. 171,624. (No model.)

*To all whom it may concern:*

Be it known that I, RUDOLPH M. HUNTER, of the city and county of Philadelphia, and State of Pennsylvania, have invented an Improvement in Electric Governors, of which the following is a specification.

My invention has reference to electric governors for dynamo-electric machines, but more especially adapted to electric railways and equivalent line-circuits where the resistances are varied and the generation of electricity is required to be increased or diminished to suit the demand; and it consists in the combination of a commutator of a dynamo-electric machine and brushes therefor, the two made relatively adjustable in a line coinciding or parallel with the axis of the commutator-shaft; further, in combining with the above an electro-magnet or solenoid with a soft-iron core and placed in the line-circuit or a shunt therefrom, whereby the variations in the resistance in the line may be felt in the solenoid, and the relative adjustment of the commutator and brushes be made accordingly, to so modify the points of contact of the commutator-sections with the brushes, and the angular position of the former with the armature-sections, that the amount of electricity generated will be automatically increased or diminished according to the demand, and in many features of minor importance, all of which is fully set forth in the following specification and shown in the accompanying drawings, which form part thereof.

The object of my invention is to provide suitable automatically-acting devices by which the amount of electricity may be generated and supplied to the line-circuit in accordance with the demand, and thereby avoid the necessity of using auxiliary resistances, which are wasteful of electrical energy, as with their use the same power is required, and the same high electro-motive force must be maintained, whether the real line-resistance be one or ten thousand ohms.

By my device the dynamo-electric machine can only generate the necessary quantity of electricity, and its electro-motive force is automatically controlled and the tension of the current varied so as to accomplish the required work and overcome the resistance actually in the line at the time of action. The advantages of this are evident, for, supposing on an electric railway the cars are running on or off the circuit, the resistance varies with each car, and if one car only is on the circuit at one time, and then additional cars are run on, it is evident that if the whole current the dynamo is capable of generating be thrown through the motor of the one car the insulation thereof would be instantly destroyed, and if the resistance were sufficiently high there would be danger to the dynamo itself.

By my improvements the generator will produce sufficient electricity for one or more cars, automatically preventing any liability to injury.

In the drawings, Figure 1 is a perspective view of my improved electric regulator. Fig. 2 is a sectional elevation of same. Fig. 3 is a plan view of a modification of same. Fig. 4 is a sectional elevation of a modification in which a weight is substituted for the spring in the regulator.

A is the armature-shaft of the dynamo-electric machine, and is provided with a feather or key, A'.

B is the commutator, which is formed with helically-shaped sections $b$. C C' are the two brushes which rest upon the said sections. Now, should the commutator be moved longitudinally on its shaft A, (being prevented from rotating by feather A',) it is evident that the brushes would advance a section, the amount of advance relative to the movement of the commutator being dependent upon the pitch of the helical sections $b$, and it is well known that any change in the relative position of the brushes and commutator after the latter has been properly set with the armature must vary the generation of electricity, as it would vary the time of energization of the armature-coils in passing through the poles of the magnetic field. The commutator is furnished with a head, B, which is preferably of brass, and is secured to the soft-iron core D, which enters the solenoid H, and is guided by the spindle E, which is secured to the armature-shaft A, and has a steadying-bearing at G. This spindle has an adjusting-nut, $e$, between which and the core D a spring, F, is placed, whose function is to oppose the attractive force of the solenoid. In place of using a spring a weighted lever, F', (see Fig. 4,) may be used, as the effects will be the same in principle.

I are the line-circuits, and I' the shunt in which the solenoid is placed. As the resistance in the line becomes increased, the current passing through the solenoid and shunt is increased, and hence the core D is attracted more or less, and as the commutator moves under the brushes the adjustment changes, as stated above.

In the modification shown in Fig. 3, the commutator is made fixed on the shaft A, and the brushes C C' are moved longitudinally, being carried by the arms J, hinged at J' to a stud, K, and upon which they are adjustable, being locked in position by the hand clamping-nut L. This stud K is secured to the slide M, which works in guides N, and to which the core D is secured. In this case the spindle E is dispensed with, as the core D would not revolve, and the adjusting devices e may be held by the frame. The solenoid in this instance is shown as in series with the line, though I prefer to arrange it in multiple arc or shunt. The movement of the brushes over the helical sections of the commutator changes their relative angular advance thereto, and produces the same results, as hereinbefore specified.

The details of construction of my improved regulator may be varied to suit the ideas of the mechanician and the style of machine to which they are to be applied; hence I do not limit myself to what is shown.

My invention comprehends the combination of a commutator with its brushes, in which they are movable longitudinally over the former, and this end may be accomplished in numerous ways, two of which have been shown; but it is understood that this is only when the parts are made for regulating the current, and not for reversing such, as when the brushes are shifted from one commutator to another, the two being arranged end to end and coupled together.

Having now described my invention, what I claim as new, and desire to secure by Letters Patent, is—

1. A commutator of a dynamo-electric machine having sections separated by lines not parallel with the armature-shaft, but which sections are not sufficiently oblique to cause a reversal of the current when the brushes are moved over their entire length, in combination with the brushes, whose width is considerably less than the length of the commutator, and means to adjust them relatively to each other in the direction of the axis of the commutator, whereby the strength of the current may be varied without reversal, substantially as and for the purpose specified.

2. The combination of the line-circuit, the commutator having its sections separated by lines not parallel with the armature-shaft and its brushes, with means controlled by the varying external resistance to adjust them relatively to each other in a line parallel or coinciding with the axis of the commutator, substantially as and for the purpose specified.

3. A commutator of a dynamo-electric machine having sections separated by lines not parallel with the armature-shaft, but which sections are not sufficiently oblique to cause a reversal of the current when the brushes are moved over their entire length, in combination with the brushes, whose width is considerably less than the length of the commutator, and means, substantially as set forth, by which both of the brushes may be simultaneously guided over the commutator-sections in the direction of the axis of the commutator, whereby the strength of current may be varied without reversal, substantially as and for the purpose specified.

4. The combination of the commutator having its sections separated by lines not parallel with the armature-shaft, the brushes therefor, a soft-iron core, and a solenoid, whereby the core in moving into or out of the solenoid changes the relative longitudinal positions of the brushes and commutators, substantially as and for the purpose specified.

5. The combination of the commutator, the brushes therefor, a soft-iron core, a solenoid, a line-circuit connecting with the brushes, and a shunt-circuit connecting with the solenoid, whereby the core in moving into or out of the solenoid changes the relative longitudinal positions of the brushes and commutator, substantially as and for the purpose specified.

6. The combination of the commutator B, having its sections separated by lines not parallel with the armature-shaft, and brushes C C', with solenoid H, core D, connecting devices by which the relative longitudinal positions of the commutator and brushes may be varied by a movement of the core, and mechanism, substantially as set forth, to oppose the attraction of the solenoid, substantially as and for the purpose specified.

7. The combination of the commutator B and brushes C C' with solenoid H, core D, line I, shunt I' through the solenoid, connecting devices by which the relative longitudinal positions of the commutator and brushes may be varied by a movement of the core, and mechanism, substantially as set forth, to oppose the attraction of the solenoid, substantially as and for the purpose specified.

8. The combination of the commutator B, having its sections separated by lines not parallel with the armature-shaft, and brushes C C', made longitudinally movable with respect to each other, with core D, solenoid H, and spring F, substantially as and for the purpose specified.

9. The combination of the commutator B, having its sections separated by lines not parallel with the armature-shaft, and brushes C C', made longitudinally movable with respect to each other, with core D, solenoid H, and spring F, and means to adjust the tension of the spring, substantially as and for the purpose specified.

10. The combination of the armature-shaft A, commutator B, and brushes C C′, made longitudinally movable with respect to each other, with core D, solenoid H, spring F, and spindle E, substantially as and for the purpose specified.

11. The combination of the armature-shaft A, commutator B, and brushes C C′, made longitudinally movable with respect to each other, with core D, solenoid H, spring F, spindle E, and adjusting-nut e, substantially as and for the purpose specified.

In testimony of which invention I hereunto set my hand.

RUDOLPH M. HUNTER.

Witnesses:
    E. M. BRECKINREED,
    WILLIAM C. MAYNE.